United States Patent [19]

Karr, Jr.

[11] Patent Number: 4,569,503
[45] Date of Patent: Feb. 11, 1986

[54] VALVE WITH REMOTE AND MANUAL ACTUATION MEANS
[75] Inventor: Michael A. Karr, Jr., Houston, Tex.
[73] Assignee: Gray Tool Company, Houston, Tex.
[21] Appl. No.: 705,588
[22] Filed: Feb. 26, 1985
[51] Int. Cl.[4] .............................................. F16K 31/143
[52] U.S. Cl. ....................................... 251/14; 251/327;
    137/556.3; 74/625; 74/424.8 VA; 192/95
[58] Field of Search ............... 251/14, 327, 337;
    137/556.3; 74/625, 424.8 VA; 192/95

[56] References Cited
U.S. PATENT DOCUMENTS

| | | |
|---|---|---|
| 2,738,945 | 3/1956 | Shafer .................................... 251/14 |
| 3,378,224 | 4/1968 | Boyle .................................... 251/14 |
| 3,789,875 | 2/1974 | McGee . | |
| 4,230,299 | 10/1980 | Pierce, Jr. ............................. 251/14 |

FOREIGN PATENT DOCUMENTS 2115111  9/1983  United Kingdom .

Primary Examiner—Arnold Rosenthal
Attorney, Agent, or Firm—Troxell K. Snyder

[57] ABSTRACT

An actuator for moving the stem (9) of a gate valve or the like is provided with hydraulic means (15,17) for driving the stem (9) axially inward and a volute spring (7) for returning the stem axially outward upon loss or other removal of the control hydraulic pressure. A ball screw (49) and ball nut (54) assembly rotatable by a disengageable drive shaft (63) is operable to manually drive the stem (9) inward during periods of insufficient control pressure.

4 Claims, 6 Drawing Figures

VALVE WITH REMOTE AND MANUAL ACTUATION MEANS

CROSS-REFERENCE TO RELATED APPLICATION

Applicant hereby incorporates by reference the copending U.S. Application entitled "Fail-Safe Valve Actuator," Ser. No. 705,576 filed by Applicant on even date herewith.

FIELD OF THE INVENTION

The present invention relates to an actuator for a flow control valve or the like, and more particularly, to an actuator remotely operable responsive to a control influence and locally operable manually during periods when said control influence is absent.

BACKGROUND OF THE INVENTION

Remotely operable actuators for flow control valves are well known in the art of fluid distribution and control. Such valve-actuator combinations find their greatest utility in harsh environments, automatic flow distribution systems, and other circumstances wherein a human operator is not typically available to manually change the flow control status of the valve.

For control valves operable between a first flow control state and a second flow control state, such as a gate valve being operable between fully open and fully closed positions, it is common to use a controllable supply of pressurized hydraulic fluid, such as liquid or gas, as a control influence to cause an actuator to depress or withdraw the valve stem of a rising stem gate valve in order to selectably effect the opening and closing of the subject valve. One particular configuration utilizing pressurized hydraulic fluid involves a hydraulic piston or the like oriented coaxially with the rising stem and arranged so as to drive the stem either inwardly or outwardly responsive to the supply of sufficient hydraulic control pressure. Such configurations typically also provide a return spring for driving the valve stem in the opposite direction upon release or failure of the pressurized control fluid supply.

Such valves, termed "fail-safe" due to the feature which returns the valve flow control state to a known condition in the absence of adequate control pressure, find particular utility in oil or gas production applications wherein it is very desirable to know the flow system configuration with certainty during periods of control system damage or equipment failure. For example, a fail-safe valve of the type discussed hereinabove may be placed in the main flow line of a remote gas or oil production or distribution facility and configured so as to typically remain hydraulically driven into the open flow control state by sufficient pressure hydraulic control fluid or gas. During normal system operation, the main gas or oil line valve would remain open, possibly with other downstream valveactuator combinations being used to direct and distribute the flow. Should a failure occur in the control system and control hydraulic pressure be lost, the main gas and/or oil line control valve would be urged into a closed position by the return spring, thus shutting off all flow to the downstream distribution system possibly preventing an overpressure, spill, equipment damage or other undesirable consequences.

Prior art valve-actuator combinations of this general type are disclosed in UK Patent Application No. GB 2 115 111, dated Sept. 1, 1983, by Akkerman and Vazquez, and U.S. Pat. No. 3,789,875, dated Feb. 5, 1974 by McGee. Each of these cited documents shows a valve actuator which is operable to either raise or lower the valve stem of a rising-stem gate valve responsive to a control influence and which further includes a spring means for driving the valve stem in the opposite direction upon release or other removal of the control influence.

As will be appreciated by those skilled in the art, it is desirable, for those applications wherein the ability of such valves to automatically move into a "failure" flow control state upon loss of control system pressure is important, that the return spring rapidly move the valve stem into the return position following loss of control pressure. For hydraulically actuated valves utilizing a liquid control fluid, and particularly for such valves located at a great distance from the source of the control fluid, it will be appreciated that the fluid resistance resulting from the necessity of driving the hydraulic control fluid out of the actuator piston and back through the control fluid supply line can be quite large and can significantly increase the time required for the actuator to move the valve into the desired flow control state. It will also be appreciated that this resistance has the greatest magnitude at the instant of failure when the control fluid is relatively static within the piston and fluid supply line. Additional inertial resistance and mechanical drag are also present in the valve and actuator mechanism. Once these inertial resistances have been overcome and the control fluid has begun to flow from the now moving valve actuator, far less force is necessary to continue the movement of the valve stem into the "failure" position.

Prior art actuators use helical coil springs which must be sized so as to provide adequate force when fully deflected for overcoming the inertial resistance of the control fluid. Once the valve stem is in motion under the influence of this type of spring, however, the constant spring rate of a coil spring results in unnecessary driving force being supplied to the valve stem. For valve actuators utilizing very strong coil springs for overcoming a high initial resistance, the actuator may be quite large and unwieldy.

It is occasionally necessary to access the bonnet retaining means of flow control valves for service, repair, or other purposes. For prior art valve actuators as discussed hereinabove, such access typically requires an almost complete disassembly of the valve-actuator combination. Such disassembly can require lengthy system shutdowns and a prolonged commitment of skilled personnel in order to ensure that such disassembly and subsequent reassembly have been correctly performed.

It may also be necessary and useful in such actuators to include means for manually altering the flow control state of the valve during periods when the control influence has failed or otherwise been removed such as for service or during installation. One critical feature of such local manual actuation systems is that they must not impair the operation of the valve and actuator combination upon restoration of the control fluid pressure. UK Patent Application GB No. 2 115 111, noted above, discloses a prior art actuator having a manual feature disengageable upon repressurization of the control fluid supply line.

What is needed is a fail-safe actuator operable both remotely and locally which is additionally able to overcome the initial inertial resistance of the control fluid in the supply line for returning the valve to a second flow control state upon failure or other removal of the remote control influence. The local manual actuation means must be operable only during periods of control influence failure and must additionally become automatically disengaged upon control influence restoration. Finally, the design of such an actuator should be both simple and compact for maximum industry acceptance and utilization.

SUMMARY OF THE INVENTION

The present invention provides an actuator for a gate valve or the like for selectably moving the gate member of the valve between a first flow control state and a second flow control state responsive to the presence or absence of sufficient control fluid or gas hydraulic pressure supplied to the valve, and during periods when insufficient control pressure is supplied, responsive to a manual valve actuator means which is automatically disengaged upon restoration of sufficient control pressure or other control influence.

To these ends, the actuator includes a telescoping hydraulic piston for driving the valve stem and gate member into the first flow control state and a volute spring for automatically returning the valve stem and gate member to the second flow control state during periods of reduced control fluid pressure. For manually operating the valve during periods of reduced control pressure, the actuator according to the present invention provides a ball screw, ball nut, and drive nut assembly coaxial with the hydraulic piston for driving the stem and gate member inward against the volute spring upon rotation of the ball screw by an engaged handwheel or the like.

Upon restoration of sufficient control fluid or gas pressure to the valve actuator, the present invention provides a means for disengaging the handwheel from the ball screw for restoring complete remote hydraulic control to the valve and actuator combination.

The use of a volute spring for returning the valve stem and gate member into the second flow control state provides the greatest return thrust at the initiation of the return actuation. The increased force at this time is particularly beneficial in overcoming the initial inertial resistance of the control fluid in the fluid supply line, thus aiding in establishing the fluid backflow necessary to effect the return actuation.

The actuator is secured to the valve bonnet by an annular bonnet adapter ring cooperatively engaged between the valve bonnet and the actuator housing for preventing relative movement therebetween. The bonnet adapter ring may be selectably disengaged and moved aside for permitting access to the bonnet securing nuts without disassembling the valve-actuator combination.

It is therefore a feature of the present invention to provide a valve and actuator selectably operable between a first flow control state and a second flow control state. It is further a feature of the present invention that the first flow control state is achieved only when sufficient hydraulic pressure is supplied to the valve actuator and, upon release of the control pressure due to failure or operator choice, the valve is automatically driven into the second flow control state.

It is still further a feature of the present invention that the means for automatically driving the valve into the second flow control state includes a volute spring having a spring rate that increases with increasing spring deflection for providing the greatest returning force when the valve is in the first flow control state.

It is also a feature of the present invention that the means for securing the valve actuator and valve provides access to the valve bonnet retaining bolts without requiring complete disassembly of the valve-actuator combination.

It is additionally a feature of the actuator according to the present invention to provide manual means engageable for reciprocating the valve between the first and second flow control states during the absence of control fluid or gas pressure.

It is even further a feature of the actuator according to the present invention to provide means for disengaging the manual means upon restoration of control pressure for restoring exclusive hydraulic control to the valve and actuator combination.

BRIEF DESCRIPTION OF THE DRAWING FIGURES

DESCRIPTION OF THE PREFERRED EMBODIMENT

Figure 1:
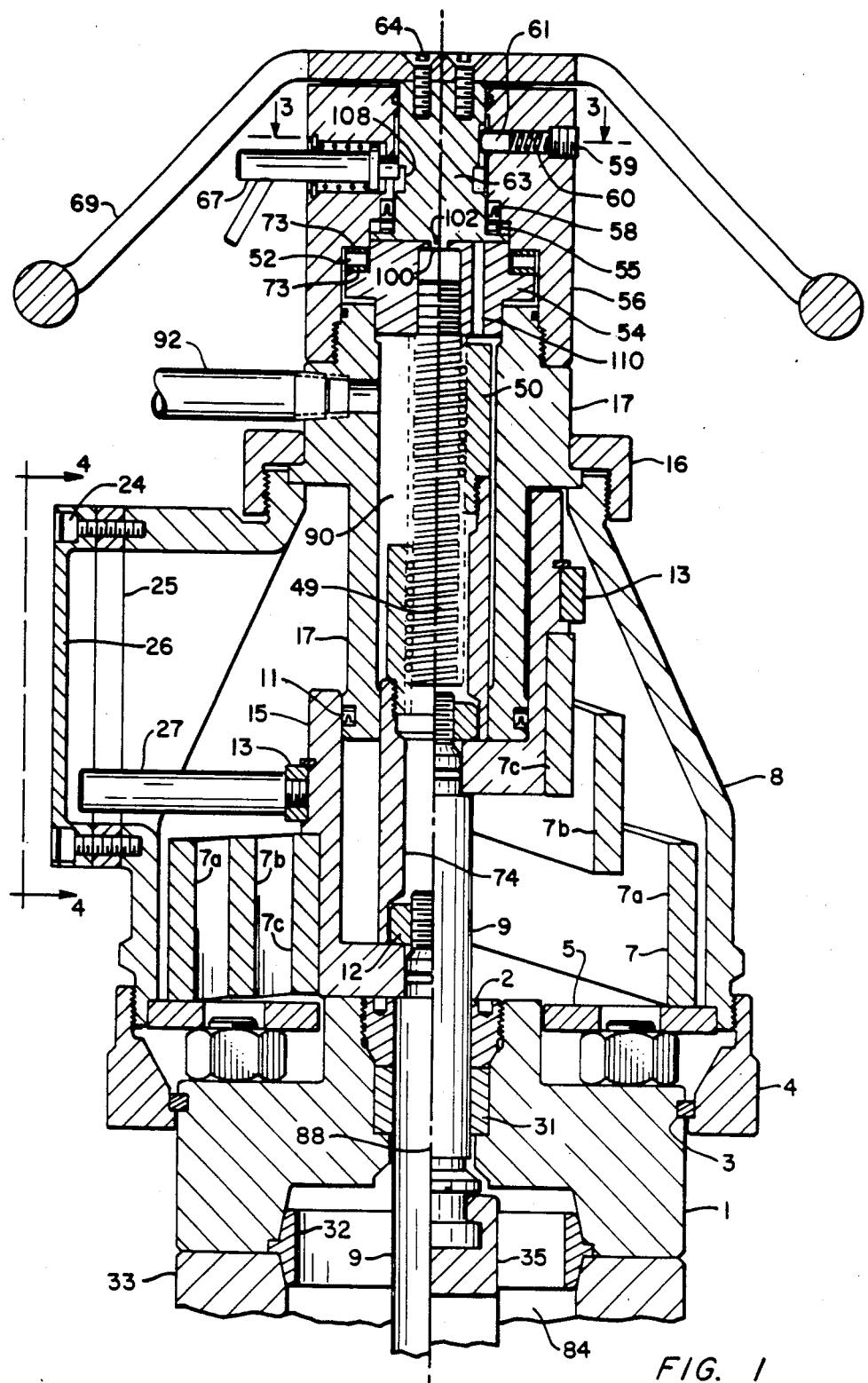
FIG. 1 is a cross sectional elevation of the upper portion of the valve and actuator according to the present invention.
Figure 2:
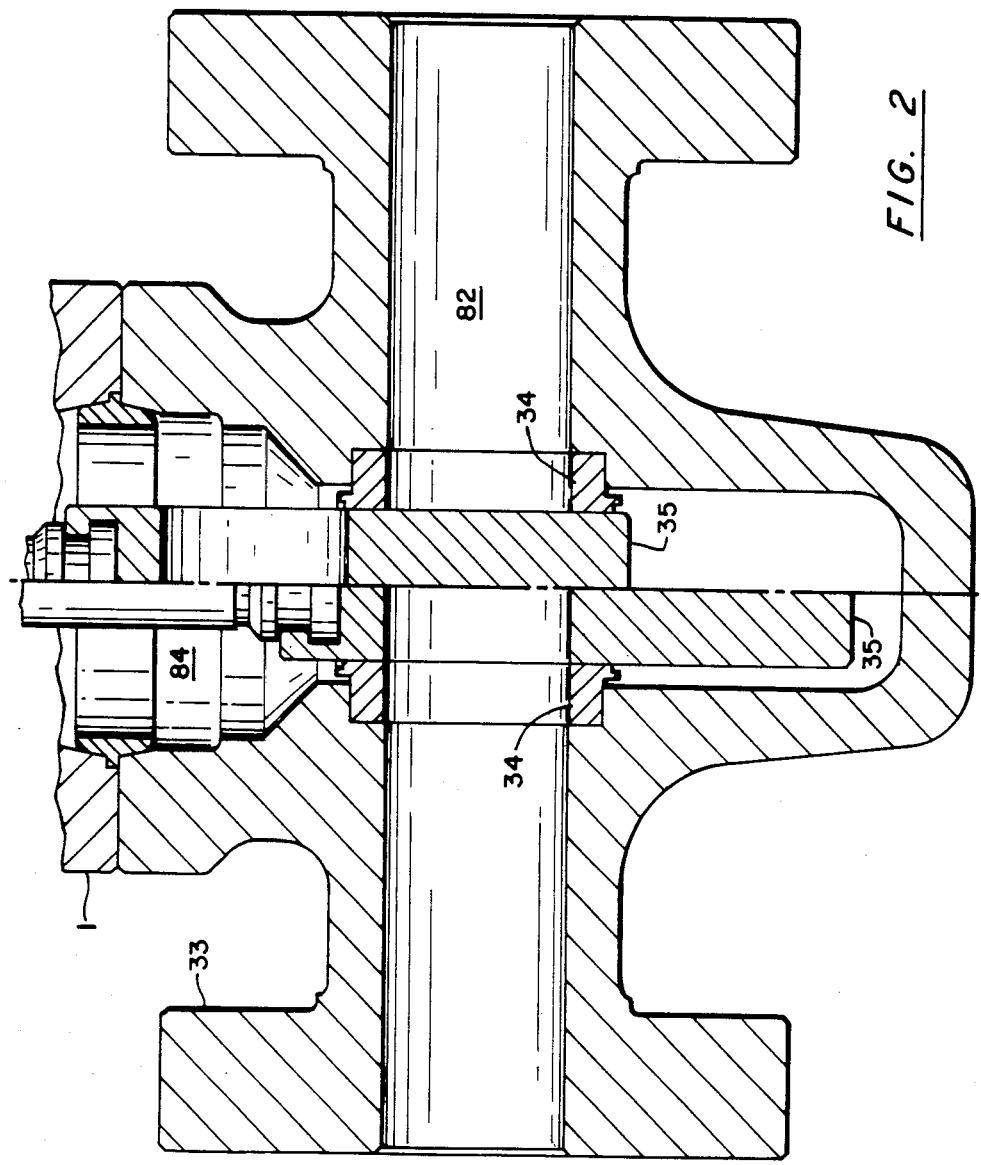
FIG. 2 is a cross sectional elevation of the lower portion of the valve and actuator according to the present invention.

Referring now to FIGS. 1 and 2, a rising stem gate valve and an actuator according to the present invention will now be described. The valve comprises a valve body 33 having a flow passage 82 disposed therein. A gate member 35 is shown transversely reciprocable with respect to the flow passage 82 between a lowered, open position (left half of FIG. 1) and a raised, closed position (right half of FIG. 1). Also shown are seat members 34 disposed around the flow passage 82 at the point of contact with the gate member 35 for providing sealing therebetween.

A valve bonnet 1 is shown secured to the valve body 33 by bolts 30 or other securing means known in the art. The bonnet 1 and body 33 form a valve cavity 84 opening into the passage 82 for receiving the gate member 35 as it reciprocates between a raised and lowered position. Sealing between the bonnet 1 and valve body 33 is a bonnet seal ring 32.

A valve stem 9 is shown cooperatively engaged with the gate member 35 and extending outwardly from the cavity 84 through a bore 86 disposed in the valve bonnet 1. Packing 31 surrounds the valve stem 9 for forming a fluid tight seal between the stem 9 and bonnet 1 while still permitting reciprocation of the valve stem 9 as shown in FIG. 1. A packing retainer nut 2 is shown threadedly engaged with the bonnet 1 for compressing and retaining the packing 31 during normal operation.

The actuator according to the present invention is best described with reference to the outer housing 8 which is shown secured to the valve bonnet 1 by the cooperative action of lock ring 3, bonnet adapter 4, and base plate 5. During assembly, the bonnet adapter 4 is dropped over the bonnet 1 and lock ring 3 secured about the bonnet 1. Next, base plate 5 and housing 8 are oriented as shown in FIG. 1 and the bonnet adapter ring 4 lifted outward and threadedly engaged with the housing 8 as shown in FIG. 1, and the assembly tightened securely by rotating bonnet adapter 4. While the actuator according to the present invention may be secured to the operated valve and in particular to the bonnet 1 of such a valve by a variety of securing means well known in the art, the particular arrangement discussed hereinabove and shown in drawing FIG. 1 has the advantage of permitting access to the bonnet securing nuts 30 without complete disassembly and removal of the actuator. This is accomplished by unscrewing the bonnet adapter 4 from a completely assembled valve and actuator combination and dropping it down about the bonnet 1. The bonnet retaining bolts 30 are thus accessible by an openend wrench and may be tightened or loosened as necessary.

Continuing with the description of the actuator according to the present invention, a piston 17 is shown disposed colinearly with the central axis 88 of the valve stem and in an outwardly axial location therefrom. The piston 17 is secured to the housing 8 by a retainer nut 16 which does not permit axial translation or rotation thereof. The piston 17 is in reality a cylindrical member, as will be further discussed hereinbelow.

Cylinder 15 is shown surrounding the piston 17 and telescopingly cooperable therewith. The cylinder 15 is secured about its inward end to the outward end of the valve stem 9 by hex nut 12. An annular piston seal ring 11 provides fluid tight sealing between the telescoping cylinder 15 and piston 17. Piston 17 and cylinder 15 partially define a control volume 90 which expands and contracts with the telescoping of the cylinder and piston 15, 17.

During operation, pressurized hydraulic fluid or gas is supplied to the control volume through the feed line 92. As is apparent from the foregoing discussion and the drawing figure, the pressurized hydraulic fluid or gas entering the control volume 90 will drive cylinder 15, and hence valve stem 9 and gate member 35, axially inward resulting in the valve as shown in FIG. 1 being opened to permit the free flow of material through the flow passage 82.

The actuator according to the present invention also includes spring means 7 for forcing the cylinder 15 axially outward upon removal of hydraulic pressure from within the control volume 90. According to the present invention, the spring means 7 is a volute spring, shown in FIG. 1 as having a plurality of rectangularly shaped blades 7a, b, c and being compressible between the cylinder 15 and the bonnet and base plate 1, 5.

Figure 5A:
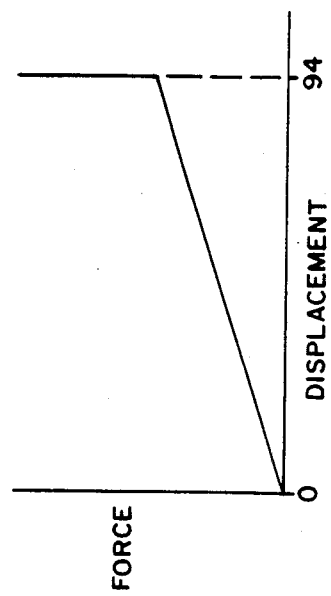
FIG. 5a is a force-displacement diagram for a standard helical coil spring.

The volute spring has particular utility in an actuator for this type of service as it has a variable spring rate which increases with increasing compression, reaching a maximum value when fully compressed as shown in the left half of FIG. 1. Moreover, as the blades 7a, b, c will "nest" as the spring is compressed, the fully compressed spring occupies nearly all of the available volume within the actuator housing 8 and presents a very low cross sectional height as compared to coil springs having similar maximum spring rates. The behavior of the volute spring 7 as used in the present invention may clearly be appreciated by a review of drawing FIGS. 5a and 5b which show the relation of compressive force and axial displacement for a standard coil spring and a volute spring, respectively. As will be noted, the amount of force necessary to compress a volute spring rises sharply as the compressive limit or bottoming point 94 is approached. For a standard coil spring, the relationship of force to distance is linear until the individual coils touch (i.e., bottom out).

Volute spring blades 7a, b, c may be fabricated in a variety of cross-sections including round, rectangular, trapezoidal, etc. Both blade shape and size may further vary over the length of the spring, thus allowing the spring rate to be particularly configured for a given application or environment. The rectangular shape shown in FIG. 1 has the advantages of relatively simple fabrication, lateral stability, and can be reshaped and/or cut down with relative ease.

Figure 5B:
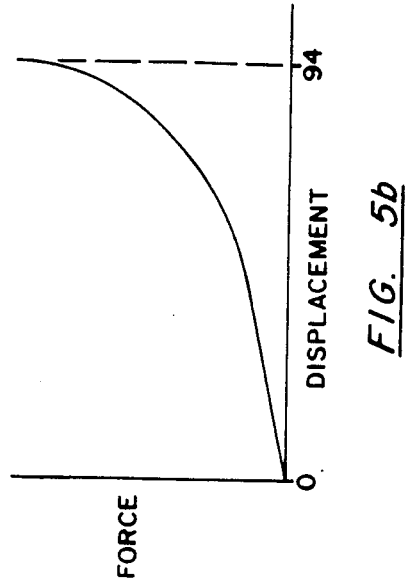
FIG. 5b is a force-displacement diagram for a volute spring.

Upon release of the hydraulic pressure holding the valve stem 9 and gate member 35 in the inward position representing a first flow control state, the volute spring 7 according to the present invention will exert its greatest force outwardly against the cylinder 15, compressing the control volume 90 and driving the hydraulic control fluid or gas back down supply line 92. As described in the preceding section, the inertial resistance to such back flow is greatest at the time of first initiation, and diminishes as the back flow of fluid or gas and movement of the valve gate becomes established. With reference to FIG. 5b it can be seen that the volute spring 7 according to the present invention supplies the greatest force when it is most needed, and a diminishing force as the stem is placed in outward axial motion toward the second flow control state.

Figure 4:
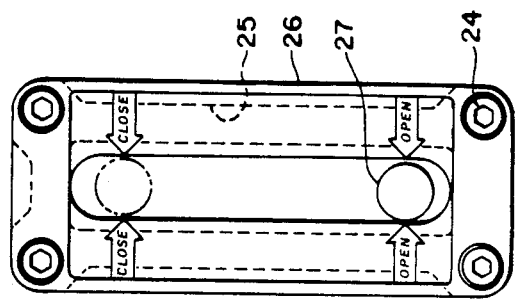
FIG. 4 is a view of the position indication means as shown in FIG. 1.

FIG. 1 also shows means for indicating the position of the gate member 35, which in the preferred embodiment is shown as a horizontal indicator rod 27, threadedly engaged with an indicator alignment ring 13 secured to the cylinder 15, and reciprocable therewith. Indicator rod 27 projects through the indicator guide plate 25 and is visible through a transparent lens 26 which is secured to the housing 8 by socket screws 24. FIG. 4 is a view of the position indicator means as indicated in FIG. 1 showing the appearance of the indicator rod 27 in the open position and, in phantom, in the closed position. Such an indicator means can have utility in the field by allowing a quick external verification of the state of the control valve from a distance and without the need to closely examine the valve mechanism.

The preferred embodiment of the present invention also includes a means for manually driving the valve stem 9 and gate 35 axially inward during those periods of time when the hydraulic control pressure is insufficient to do so. This means includes a ball screw 49 disposed colinearly with the central axis 88 of the valve stem 9 and axially outward therefrom. As shown in FIG. 1, ball screw 49 is in fact disposed within the piston 17. The ball screw is threadedly secured to the ball screw hub 54 and rotatable therewith.

The hub 54 is retained from outward axial motion by the retainer cap 56 shown threadedly engaged with the piston 17. Thrust washers 73 and needle bearing 52 permit rotation of the ball hub 54 about the central axis 88.

The valve stem 9 is driven inward by the combined action of ball nut 50 and override hex nut 74 which are shown cooperatively engaged for forcing the valve stem axially inward upon relative rotation between the ball screw 49 and ball nut 50. This relative rotation is accomplished in the preferred embodiment as shown in FIG. 1 by rotating ball hub 54 in a counterclockwise direction when viewed from a point directly above the actuator assembly. The outer surface of override hex nut 74 is a hexagonal shape which closely fits within the lower end of the piston 17 for preventing relative rotation therebetween while still permitting axial translation. This cooperative engagement of the piston 17 and override hex nut 74 prevents rotation of the hex nut 74, and hence the ball nut 50, resulting in the ball and hex nut assembly 50, 74 being driven axially inward upon counterclockwise rotation of the ball hub and screw assembly 54, 49.

As will be appreciated by those familiar with ball nuts and ball screws, there is very little resistance provided by such an assembly to run-back resulting from axial thrust. In simple terms, unless the ball hub and screw assembly 54, 49 as shown in FIG. 1 is restrained from rotation, the unopposed action of the volute spring 7 against the cylinder 15 is easily able to push the extended override hex nut 74 and ball nut 50 axially outward as the ball screw 49 spins freely as a result. This behavior is unlike ordinary screw and nut assemblies wherein axial thrust on either the screw or engaged nut will not easily produce counter-rotation in the other member for permitting relative axial translation.

In accordance with the present invention the preferred embodiment of FIG. 1 includes a means for manually rotating the ball hub and screw assembly 54, 49 in a counterclockwise direction during those periods when insufficient hydraulic control pressure is present in the control volume 90 and for preventing back rotation of the ball hub and screw assembly 54, 49 until such time as control hydraulic pressure is restored or the actuator is manually released to return to the second flow control state. This is accomplished by means of the drive shaft 63 rotatable about the central axis 88 and generally held in position by the retainer cap 56. As can be seen in FIG. 1, drive shaft 63 is engageable with the ball hub 54 by means of a slot 100 and a drive key 102 each respectively disposed in the ball hub 54 and drive shaft 63.

Drive shaft 63 is additionally reciprocable along axis 88 between a raised, disengaged position and a lowered, engaged position as shown in FIG. 1. During periods of reduced hydraulic control pressure, a human operator may engage a drive shaft 63 with ball hub 54 by withdrawing spring loaded detent plunger 67 against plunger coil spring 65 thus allowing drive shaft 63 to be lowered for engaging the drive key 102 with the drive slot 100. Counterclockwise rotation of the handwheel 69 shown secured 64 to the drive shaft 63 results in counterclockwise rotation of the ball hub 54 and ball screw 49, thus driving the ball nut 50 and override hex nut 74 inward against the cylinder 15. Sufficient rotation will drive the piston 15 and valve stem 9 results in the flow valve being moved from the second flow control state to the first flow control state as shown in the left half of FIG. 1.

Figure 3:
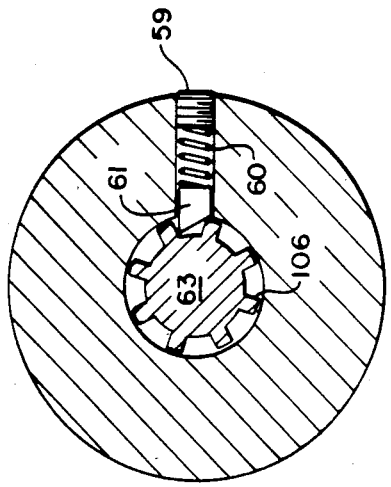
FIG. 3 is a cross sectional view as indicated in FIG. 1.

Clockwise back-rotation of the drive shaft 63 is prevented by the ratchet assembly 61, 60, 59 comprising ratchet 61, ratchet spring 60, and set screw 59 shown in FIG. 1 and, more clearly, FIG. 3. As can be seen in FIG. 3, the ratchet 61 is beveled so as to be forced aside by the drive shaft splines 106 during counterclockwise rotation of the drive shaft 63. Clockwise rotation of the shaft 63 is prevented by the ratchet 61 which is driven radially inward by the cooperative action of the ratchet spring 60 against the set screw 59.

The drive shaft 63 may be disengaged from the ball hub 54 in either of two ways. The drive shaft may be manually raised by a human operator pulling the handwheel 69 axially outward. Drive key 102 is thus withdrawn from drive slot 100 and detent plunger 67 reenters the detent groove 108 shown disposed circumferentially about the drive shaft 63 for retaining the shaft in the raised, disengaged position.

The drive shaft 63 may also be disengaged automatically by a recurrence of sufficient hydraulic pressure within the control volume 90. As can be seen again in FIG. 1, sufficient pressure in control volume 90 is transmitted to the axially inward end of the drive shaft 63 by the vent passage 110 disposed in the ball hub 54. The drive shaft 63 is driven axially outward into the disengaged, raised position by the hydraulic control fluid or gas acting through the vent 110 on the inner end of the shaft 63. Leakage between the shaft 63 and retainer cap 56 is prevented by the sliding seal ring 58.

The full range of features of the valve and actuator combination according to the present invention should now be apparent to those skilled in the art. The actuator is remotely operable to position the control valve between first and second flow control states responsive to the respective presence or absence of a control influence such as sufficient pressure hydraulic control liquid or gas supplied via supply line 92. The same valve-actuator combination is manually operable between said first and second flow control states during periods of insufficient hydraulic control pressure by means of a manual actuator which may be engaged for driving the control valve into the first flow control state, and subsequently manually disengaged for allowing the actuator to automatically drive itself into the second flow control state.

The valve-actuator combination according to the present invention also has the feature of automatically disengaging the manual actuation means upon restoration of sufficient control pressure via supply line 92, thus restoring full remote hydraulic control to the actuator. Such disengagement allows the ball hub 54 and ball screw 49 to spin freely during a subsequent removal or failure of the hydraulic control supply at which time the volute spring 7 drives the control valve into the second flow control state.

Finally, it should be apparent that the actuator according to the present invention, and especially as a consequence of the use of the volute spring 7, provides the greatest returning force to the valve stem 9 when the stem is driven completely axially inward. Such maximum thrust is beneficial upon release or failure of the hydraulic control pressure as it facilitates initiating the backflow of hydraulic control fluid or gas out of the control volume 90 and back down supply line 92, as well as overcoming any mechanical inertia or drag.

It is to be noted that the drawing figures and foregoing discussion have been directed toward what Applicant believe is the best mode for carrying out the subject invention. As such, the disclosure and drawing figures should be interpreted in an illustrative and not a limiting sense. It should further be noted that although the invention has been disclosed in conjunction with a gate valve, the actuator according to the present invention is equally useful with other types of valves utilizing a rising stem or other linearly reciprocable operating member. Likewise, although the gate valve shown and discussed herein was of the type which is opened to full material flow when the stem is fully inserted and closed to material flow when the stem is outwardly withdrawn, it would also be equivalent to employ the actuator according to the present invention with a gate valve in which the opposite was true. In such a case, the valve would "fail open" upon loss of control fluid pressure, finding possible use for dispensing fire extinguishing materials or for safely venting a pressure tank.

It should further be noted that the hydraulic fluid herein described as the control influence for operating the actuator according to the present invention is hereby defined to include not only use of those liquids and gases typically associated with equipment control, but also the use of the controlled fluid or gas or any other flowable pressurized material capable of hydraulically, pneumatically, or otherwise imparting motion to the valve stem. The control influence may also equivalently comprise any mechanical, electrical, magnetic or other physical phenomena having the ability to urge the valve stem 9 in the desired direction.

I claim:

1. A fail-safe gate valve, comprising:
a valve body having a flow passage disposed therein for conducting a flowing stream of material therethrough, the valve body further having a cavity disposed therein, the cavity opening at one end thereof transversely into the flow passage and at the other end thereof at the surface of the valve body;
a bonnet, sealingly secured to the valve body about the other end of the cavity opening, the bonnet further including a central bore therethrough opening into the cavity on one end thereof;
an elongated stem, disposed within the central bore and axially reciprocable therein, the stem having an inner end terminating within the cavity and an outer end terminating exterior to the valve body and bonnet;
a gate member, engaged with the stem at the inner end thereof and reciprocable therewith, for regulating the flowing stream of material in response to the axial reciprocation of the stem;
means, cooperating with the bonnet, for urging the stem axially inward responsive to a source of pressurized fluid, the urging means including
a hollow cylinder having a first closed end secured to the axially outward end of the stem, the cylinder further extending axially outward from the stem and having a second open end,
a hollow piston of generally cylindrical shape oriented colinearly with the cylinder, the piston being closed at the first outer end and being open at a second, inner end, the piston further being sealingly axially telescopingly receivable within the cylinder for forming an expandable control volume therewithin, and
a housing, secured to the bonnet and surrounding the valve stem, cylinder, piston, and return spring, the housing further being supportively secured to the piston for preventing any movement thereof relative to the bonnet;
a volute spring, disposed about the valve stem and being axially compressible responsive to axially inward motion of the stem, for driving the stem axially outward upon removal of the source of pressurized fluid;
a rotatable ball screw, coaxial with the stem and disposed within the piston, the screw having an inward end and an outward end;
a hub, fixedly secured to the outward end of the ball screw and rotatable therewith, including means for venting the control volume axially outward;
a retainer cap, releasably secured to the outer end of the piston, for surrounding and restraining the hub from outward axial movement while simultaneously permitting the rotational movement thereof;
a ball nut, cooperatively engaged with the ball screw;
a cylindrical override hex nut, secured to the ball nut and axially translatable therewith upon relative rotation between the ball nut and the ball screw, the override hex nut further being cooperatively engaged with the inner end of the piston for preventing relative rotation therebetween, the override hex nut still further being axially inwardly movable for driving the stem, cylinder, and gate member axially inward in response to the occurrence of relative rotation between the ball nut and ball screw; and
means, selectably engageable with the hub during periods of insufficient control volume pressure, for rotating the hub.

2. The valve as recited in claim 1, wherein the volute spring has coils of rectangular cross section.

3. The gate valve as recited in claim 1, wherein the rotating means further includes:
a drive shaft, slidably disposed within the retainer cap and axially reciprocable therethrough between an inner lowered position and an outer raised position;
means for engaging the drive shaft and the hub against relative rotational motion therebetween when the drive shaft is positioned at the inner lowered position;
a ratchet for preventing back-rotation of the drive shaft; and
a handwheel, secured to the drive shaft, for manually rotating the engaged drive shaft and hub.

4. The gate valve as described in claim 3 wherein the drive shaft and retainer cap form a sealing closure over the outward end of the piston and wherein the hub includes a vent disposed therein for admitting the pressurized control fluid from the control volume into contact with the inner end of the drive shaft for lifting the shaft into the outer raised position responsive to the occurrence of sufficient pressure within the control volume.

* * * * *